United States Patent [19]

Lin

[11] Patent Number: 4,991,200
[45] Date of Patent: Feb. 5, 1991

[54] INTERFACE DEVICE FOR THE INTERCOMMUNICATION OF A COMPUTER AND A FAX MACHINE

[76] Inventor: Paul Lin, 5 Fl., No. 25, Tunhwa S. Rd., Taipei City, Taiwan

[21] Appl. No.: 253,230

[22] Filed: Oct. 4, 1988

Related U.S. Application Data

[63] Continuation-in-part of Ser. No. 102,101, Sep. 29, 1987, abandoned.

[51] Int. Cl.$^5$ .......................... H04N 1/00; H04N 1/32
[52] U.S. Cl. ..................................... 379/100; 358/442; 358/468
[58] Field of Search .................. 379/100, 93; 358/407, 358/442, 468, 476

[56] References Cited

U.S. PATENT DOCUMENTS

| | | | |
|---|---|---|---|
| 3,558,811 | 1/1971 | Montevecchio | 358/442 |
| 3,830,962 | 8/1974 | Mailloux | 358/442 |
| 4,578,537 | 3/1986 | Faggin et al. | 379/100 |
| 4,652,933 | 3/1987 | Koshiishi | 358/442 |
| 4,660,218 | 4/1987 | Hashimoto | 379/93 |
| 4,663,778 | 5/1987 | Takahashi | 379/100 |
| 4,794,637 | 12/1988 | Hashimoto | 379/100 |
| 4,816,911 | 3/1989 | Kirsch et al. | 379/100 |

Primary Examiner—Jin F. Ng
Assistant Examiner—Stella L. Woo
Attorney, Agent, or Firm—Poms, Smith, Lande & Rose

[57] ABSTRACT

An interface device for the intercommunication of a computer and a fax machine which is respectively connected to a computer (3), a fax machine (2) and a cable to the central office or a private branch exchange. It comprises a controller (4) and a switching/simulating unit (1). It makes possible the utilization of the fax machine as the printer or the scanner for the computer without changing the structure of the computer or the fax machine. The interface can also be used exclusively to interconnect the computer (3) and the fax machine (2). The switching/simulating unit comprises four selector switches (S1) to (S4) which are OFF or ON in proper time to allow the two desired stations of the three to communicate with each other.

3 Claims, 8 Drawing Sheets

INTERFACE DEVICE FOR THE INTERCOMMUNICATION OF A COMPUTER AND A FAX MACHINE

It is a continuation in part of the U.S patent application Ser. No. 102,101, filed Jul. 29, 1987, now abandoned.

The present invention relates to an interface for the intercommunication of a computer and a fax machine to utilize the latter as the printer and the scanner for the former.

The fax machine is becoming increasingly important in communication. It receives and prints out the information from a remote fax machine or scans the information printed on a sheet and transmits it to a remote fax machine via the telephone lines of a Central Office/Private Branch Exchange (CO/PBX). With the trend toward automation of offices, all the devices involved in the communication of information are desired to be connected "on line" to form an entire system. However, the information in a computer cannot be directly transmitted to a remote fax machine, unless the computer is connected to the cable to the central office via an interface. The information must be first printed out on a sheet and then scanned by a local fax machine and transmitted to the remote fax machine. Likewise, any information from a remote fax machine cannot be directly saved or displayed by the computer unless the latter is connected on line with the central office, and must be first received and printed out by the local fax machine and then input (by a scanner or from the keyboard) into the computer. The printing and scanning procedures greatly delay the time of data transmission, and considerably increase the distortion of the transmitted information. Even if the computer is connected to the central office via an interface, the computer and the fax machine still work independently, and are not really connected on line to form an entity.

To solve this problem, a fax-module (fax card) was developed to offer a computer the function of a fax machine. Referring to FIG. 8, the fax-module is provided between the cable to the central office or a private branch exchange (CO/PBX) and a personal computer (PC). When serving as a fax machine, the computer must be used in cooperation with an input device (scanner) and an output device (printer). (Note: Here the printer is unlike the ordinary dot-matrix printers of computer which can only print simple characters. The resolution of the printer must be high enough to describe the subtle details of any figures in facsimile transmission. Otherwise the resulting device is not a fax machine, but a telex machine. Needless to say, a printer of such high resolution is very expensive.) Any information from a remote fax machine is converted by the fax-module into a language readable by the computer and is stored in the memory of the computer or displayed on its monitor, or printed out by the printer. On the other hand, the information to be transmitted can be scanned from a sheet of paper into the computer and converted into a signal acceptable by the fax machines by means of the fax-module and then transmitted to a remote fax machine. Any information stored in the memory of the computer is also transmitted via this fax-module to a remote fax machine.

A drawback of the fax-module consists in that the equipped computer can do nothing else but serve as a fax machine, unless the fax-module is removed from the port in the computer. Moreover, such a fax module needs a scanner and a printer (a very expensive one) for input/output purposes. When the computer is thus equipped and able to perform the function of a fax machine, the original fax machine will retire and is left unused in the corner of the office.

In fact, the fax machine is provided with its own scanner and printer. If we can provide a suitable interface to replace the conventional fax-module and directly use the available fax machine as the I/O device for the computer without changing the structure of the computer and the fax machine, then the extra expense for a printer and a scanner will be saved, and the fax machine will not become obsolete with the equipped computer. Also, it is preferred that the equipped computer can still execute all its function as a computer as well as serving as a fax machine regardless of the equipment of the interface.

U.S. Pat. No. 4,652,933 discloses a system comprising a computer and an equipped facsimile machine, in which the facsimile machine is connected between the computer and a cable to the central office. The facsimile machine can be used as the printer or the scanner for the computer. In this device, the fax machine is greatly modified. Therefore, the user cannot use his original fax machine, and has to purchase a new equipped fax machine to build such a system. If we want to modify the original fax machine to such an equipped fax machine, the cost for modification is extremely expensive. Moreover, such device lacks informing means to inform the computer of the arrival of information (either transmitted from the central office or scanned from the fax machine), in advance so that the computer can prepare to receive it. Without the precedent information of the arrival of information, the computer may sometimes fail to receive it successfully.

Accordingly, it is the chief object of the present invention to provide an interface device which makes it possible to utilize an available fax machine as the printer and scanner of a computer without any change in the structure of the fax machine or the computer, while preserving all the inherent capability of the computer or the fax machine to communicate with the central office or remote facsimile terminals. In so doing, the computer and the fax machine will become an integral part of the whole communication system.

To achieve this object, this interface device must be respectively connected to the computer, the fax machine (hereinafter specifically referred to as "local fax machine" to distinguish it from the "remote fax machines") and the cable to the central office to selectively interconnect any two of them. In practical use, there are six possible conditions:

(A) Computer to fax machine (The local fax machine is used as a printer to print out the information from the computer);

(B) Fax machine to computer (The local fax machine is used as a scanner to read information on a sheet into the computer);

(C) Computer to the central office (The information in the computer is transmitted to the central office or to a remote fax machine);

(D) Central Office to computer (The information from the central office or from a remote fax machine is transmitted to the computer);

(E) Fax machine to central office (The information is directly transmitted by the local fax machine to the central office or a remote fax machine);

(F) Central Office to fax machine (The information is transmitted from the central office or a remote fax machine to the local fax machine).

In conditions (A) and (B), the computer and the local fax machine are interconnected.

In conditions (C) and (D), the computer and the cable to the central office are interconnected.

In conditions (E) and (F), the local fax machine and the cable to the central office are interconnected.

To build the selective interconnection among the computer, the cable to the central office and the local fax machine, the interface must comprise a switching system to selectively interconnect any two of the three to carry out the functions of (A) to (F).

In conditions (C) (D) (E) and (F), the communication involves the central office. But in conditions (A) and (B), the central office does not take part in the communication. Thus, in conditions (A) and (B), a simulation of the central office is required.

The simulation of the central office involves a "ring-signal generator" and an "off-hook detector".

To carry out the function of (A), there exists a problem. A fax machine is unlike an ordinary printer. One can easily give a "print" command from the computer to let a printer print out information stored in the computer, but a fax machine is not responsive to the "print" command. Therefore, if we desire to use the fax machine as a printer for the computer, the interface must be able to convert the "print" command into a special signal to which the fax machine is responsive. A fax machine Y can be responsive to the fascimile transmission from another fax machine X because the transmission is preceded by "ring-signals", which serve as the key to "unlock" a fax machine. The "ring-signals" are intermittent pulses which are produced by a "ring-signal generator" in the central office and sent to fax machine Y before the two fax machines X and Y become interconnected. If fax machine is not busy, the ring-signal detector in the fax machine will detect the ring-signal and the fax machine will be readily to print out the information. In condition (A), we must make the local fax machine believe that it just receives information from a remote fax machine and not from the computer. For this purpose, the interface device must produce "ring-signals". Hence the interface device is provided with a "ring-signal generator" to produce the ring-signals which are identical to the ring-signals given by the central office in facsimile transmission. [Note: In the prior art U.S. Pat. No. 4,652,933, the fax machine is modified and the output of the computer does not directly enter the fax machine from its normal I/O port, but is connected directly to its printing mechanism. Therefore it does not need ring-signals to activate the printing function of the fax machine.]

Also, it is noteworthy that in facsmile transmission, a local fax machine X can only communicate with a remote fax machine Y when neither of them are busy (or "occupied"). The central office has an off-hook detector to detect the state of the fax machines. [Note: Since the term "off-hook" is sometimes unclear, we must announce in advance that the term "off-hook" here is carefully used and mostly refers to the state in which the fax machine is not busy and its handpiece is "taken off". In the case of telephone communication, a telephone has three possible states, namely ON-HOOK (the handpiece is hung on the hook), OFF-HOOK (the handpiece is taken off from the hook) and BUSY (or occupied), which can be perceived by the off-hook detector of the central office. A telephone is only communicable with the central office when it is in the "off-hook" state. Only when both telephones are detected as in the OFF-HOOK state will the central office allow them to interconnect with each other, so that the communication between the two telephones becomes possible. However, in the case of facsimile transmission, the sense "off-hook" is slightly different from telephone communication. To build the interconnection between two fax machines, the handpiece of the transmitting side must be taken off (OFF-HOOK), but the handpiece of the receiving side need not be taken off to allow its "off-hook" state to be perceived, since the fax machine is provided with an "auto off-hook mechanism" which will automatically switch a fax-machine from ON-HOOK to electrically OFF-HOOK state (forced OFF-HOOK) when the fax machine receives a ring signal from the central office. Thus even though on the surface the handpiece of a fax machine Y is still hung on the hook, the off-hook detector will perceive the "OFF-HOOK" state of the fax machine Y, so the information from a fax machine X can be transmitted to fax machine Y. This auto off-hook mechanism enables a fax machine to receive and print out the information during the night when there is nobody in the office to take off the handpiece when the machine rings. But it also makes the sense "off-hook" somewhat confusing. For the sake of clarity, we carefully adopt the term "AVAILABLE" (or more accurately "NOT BUSY") to describe the successive, non-busy state (firstly "ON-HOOK" and then forced "OFF-HOOK") of a fax machine when it is receiving information, since a fax machine is "available" to receive and print information when its "busy" state is not perceived. Thus when a fax machine is not printing and is handpiece is hung on the hook, we say it is "available". When there is no ring-signal, the off-hook detector will perceive that the available fax machine is in the "on-hook" state. When receiving the first ring-signal, the fax machine will automatically change from "on-hook" to "off-hook"state even though its handpiece is not taken off, and the off-hook detector will perceive its "off-hook" state. It is noteworthy that if the handpiece of the fax machine is not hung on the hook during the arrival of the first ring signal, it cannot be said "available" even though the fax machine is not printing or scanning anything, since if the handpiece is not hung up before the arrival of the ring signal, the off-hook detector does not perceive the "off-hook" state, but perceives the "busy" state of the fax machine. Only when the local fax machine is "available" can it be used as a printer for the computer. However, we still have to use the term "off-hook" when the fax machine is scanning information, since the scanning function can only be done when the fax machine is not printing and the handpiece is taken off from the hook.] Suppose a fax machine X is transmitting information to another fax machine Y, the off-hook detector of the central office will perceive the "off-hook" state of X at the moment when the hook of X is taken off. So fax machine X becomes communicable with the central office. Then the central office will start to send ring signals to Y, and detect if Y is "available". If Y is available, the off-hook detector will then perceive the "off-hook" state of fax machine Y, thus Y also becomes communicable with the central office. Now the ring signal is no longer needed, and will be stopped, and X and Y becomes intercommunicable via the central office, so the information can be transmitted from X to Y.

Therefore, in condition (A), when the local fax machine is used as a printer, its role is equivalent to the aforesaid fax machine Y, and the role of the interface device is equivalent to the central office. Thus the simulation of the central office involves:

1. The interface sends ring signals to the local fax machine and detects its availability;

2. If the fax machine is available, the off-hook detector will perceive the "off-hook" state of the fax machine, and the latter is communicable with the interface. Thus the information from the computer is sent to the fax machine via the interface device. Meanwhile the ring-signal generator stops producing ring-signals.

In condition (B), the role of the local fax machine is equivalent to the aforesaid fax machine X, and the simulation of the interface involves the following procedure:

When the handpiece of the local fax machine is taken off, the interface device will immediately perceive its "off-hook" state, and the local fax machine is communicable with the interface. [But the interface need not send ring signals to the computer, since the computer can be informed of the arrival of information by means of a simpler way which will be mentioned later.]

Therefore, the interface device according to the present invention is further provided with an "off-hook" detector to detect whether the local fax machine is available, "OFF-HOOK", or otherwise busy. Unlike the ring-signal generator which only sends out ring-signals in a specific period, the off-hook detector is always detecting the state of the fax machine.

Thus, in condition (A), when the interface receives information with a "print" command from the computer, the ring signal generator will start to send out ring-signals. If the local fax machine is detected as "available", then the ring-signals can enter the fax machine to actuate its printing function, so that the information can be printed out. Since the ring-signals are only used to trigger the printing function of the fax machine, once the printing function is actuated, the ring-signals are not longer necessary. So, the ring-signal generator will stop sending out ring signals.

If the local fax machine is not "available", the computer will have to wait and the ring-signal generator will continue to send out ring-signals to the local fax machine until it is detected as available. [Note, the waiting of the computer is not unlimited. Generally the waiting of the computer does not last over a predetermined period. The reason will be explained later.]

Since the computer does not need the "ring-signals" to initiate the input of information into it, the ring-signal generator is not involved in condition (B). However, the off-hook detector is still indispensible, because a computer must be informed of the arrival of information in advance so that it can be ready to receive the information. Otherwise the scanned information may sometimes fail to be read into the computer. [Note: In the conventional telecom system, when a computer is connected to the central office via the cable, a modem or the like (for example, a DAA) must be provided to convert the signals of the computer into a form transmissible in the cable and to convert the information in the cable into a form readable by the computer. Also, when an information comes from the central office, the computer must be informed in advance, so that it can be prepared to receive the information. Therefore, there is provided a ring detector which can detect the ring-signal from the central office and inform the computer of the arrival of the information. An accessory telephone set and a telephone detector can be optionally provided to dial the number of a remote station. However, in condition (B), when an information comes from the local fax machine, we can use a simpler way to inform the computer of the arrival of an information from the local fax machine without involving the ring signals. We can utilize the aforesaid off-hook detector to carry out this task.] When the fax machine is used as a scanner for the computer, the hook of the telephone attached to the fax machine must be taken off at first. When the hook is taken off, the off-hook detector in the interface immediately perceives the "off-hook" state of the fax machine, so the computer will be informed of the arrival of the scanned information, and the path from the local fax machine to the computer will become possible.

The off-hook detector and ring-signal generator are all "passive" devices. Since the off-hook detector is always detecting the state of the fax machine, we do not need anything to control its activation or deactivation. However, since the ring-signal generator only sends out signals in some specific time, its activation and deactivation must be controlled. Nevertheless, a ring-signal generator only know to send out ring-signals, but does not know when to start or stop sending out signals. So we need an active device to activate or to deactivate the ring-signal generator in correct moment. Thus the interface is further provided with a controller as active device. The controller is virtually a microcomputer which has a software to control the switching system and the ring-signal generator. [More correctly speaking, the simulation of the central office not only involves the ring-signal generator and off-hook detector (as hardware part), but also involves parts of the software of the controller (as software part) that control the ring-signal generator in response to the detection of the state of the fax machine.]

Therefore, the interface device consists of a switching system, a ring-signal generator, an off-hook detector and a controller. The switching system, the ring-signal generator and the off-hook detector make up the "passive" part of the interface device, and can be called a "switching/simulating unit" (or simply referred to as "FAXPRO" hereinafter), while the controller forms the "active" part thereof. The ring-signal generator and the off-hook detector are the simulating part of the interface device involved in the simulation of the central office. They are similar to the ring-signal generator and off-hook detector in the central office or private branch exchange. They can be said a miniaturized (or scaled-down) type of the latter and serve to similate the function of the CO/PBX, thus their detailed description is not necessary. Moreover, it is desired that the changeover from a function of (A) (B) (C) (D) (E) and (F) to another be performed automatically as much as possible. For example, if the computer and the cable are interconnected, when we give a "print" command, the selector switches must be automatically switched over so that the computer and the fax machine are interconnected. In so doing, the user need not waste the time to switch over the selector switches when changing the application of his assembly. The automatic switching-over function is also achieved by the software of the controller.

It is noteworthy that the aforesaid conditions (C) and (D) are similar to the conventional communication between the ordinary computer and the central office. Also, the conditions (E) and (F) are similar to that of ordinary fax machines and the central office. In other words, conventionally, a computer or a fax machine can communicate with the central office without the interface of this invention. Therefore in conditions (C), (D), (E) and (F), the simulating part of the interface is not involved, and only the switching system is involved to selectively interconnect the computer or the fax machine to the central office. Only in conditions (A) and (B), in which the cable to the central office is disconnected, a simulation of the central office is necessary, so the simulating part of the interface is involved.

Apart from the computer, the fax machine and the cable to the central office, the interface device can be optionally connected to an accessory telephone set. (This telephone is not to be confused with the telephone attached to the fax machine!) The accessory telephone works in a similar way as the telephone used in a conventional telecom system, therefore its detailed description is not necessary. It can be used to dial the number of the station to which an information is to be transmitted. When such an accessory telephone set is provided, a telephone detector must be provided between the cable and the accessory telephone set.

As stated before, if the computer is connected with the central office, a ring-signal detector must be provided so that when there is information coming from the central office, the ring detector will perceive the ring-signal of the information given by the central office and inform the computer that information is coming, so that the computer will be ready to receive this information. The telephone set and telephone detector are optional, but the ring-signal detector is indispensible since the dialing function of the accessory telephone can also be done by the keyboard of the computer, yet without the ring-signal detector, the computer cannot be informed of the arrival of the information from the central office to prepare to receive it. The ring-signal detector and the telephone detector are similar to the ring-signal detector and telephone detector used for conventional intercommucation between a computer and the central office and are not a part of the interface of this invention, thus their detailed description can be omitted.

This invention will be better understood when read in connection with the accompanying drawing in which:

DETAILED DESCRIPTION OF PREFERRED EMBODIMENT

Figure 1:
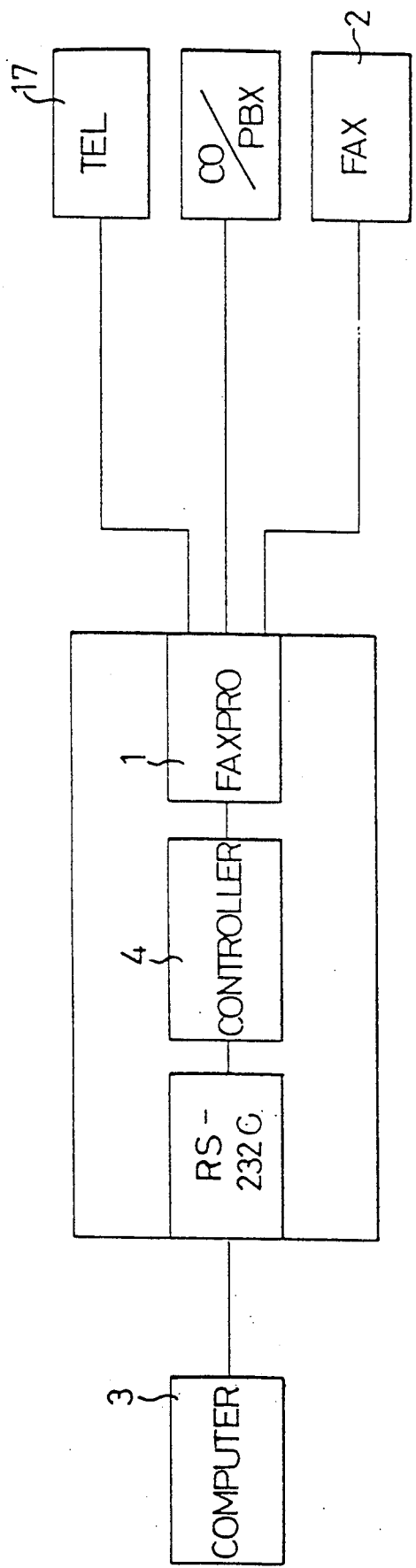
FIG. 1 is a brief block diagram showing the interconnection of a computer, a fax machine, an accessory telephone set, the central office private branch exchange and the interface of this invention.
Figure 2:
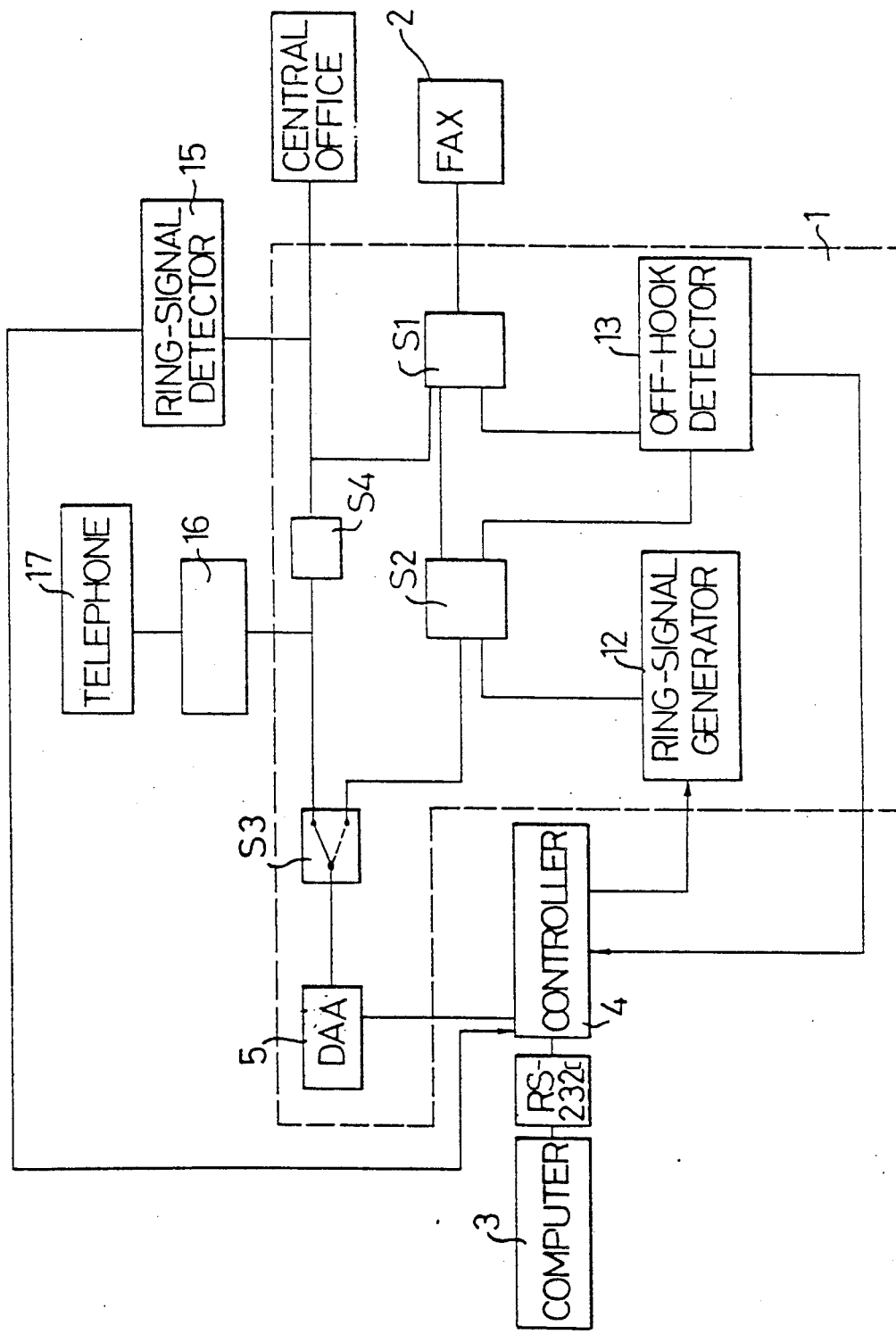
FIG. 2 is a detailed block diagram of FIG. 1.

As stated before, the interface device of this invention comprises a switching/simulating unit (1) and a controller (4). Please refer to FIG. 1, the switching/simulating unit (1) (here referred to as "FAXPRO") is connected respectively to the cable to the central office, a fax machine (2), and a computer (3). [and also an accessory telephone (17), if desired.] The controller (4) is disposed between the computer (3) and the FAXPRO (1). An RS-232C can be optionally disposed between the computer and the controller. The RS-232C serves as an interface port. (Apart from RS-232C, other currently available devices like RS-4222 or Centronic can also be used. But RS-232C is by far the most satisfactory.) The use of RS-232C is a known art, so its detailed description is not necessary.

A data access arrangement (5) (DAA) is disposed between the interface (1) and the controller (4). It is used to convert the information transmitted by the telephone line from the central office or from the local fax machine (2) into a language readable by the computer or the controller, and to convert the signal from the computer into a form transmissible in the cable or acceptable by the local fax machine (2). Since this technology is also well-known, its detailed description is not necessary.

As stated before, the FAXPRO (1) has a switching system [in the illustrated embodiment, the switching system includes three selector switches (S1), (S2) and (S3) and an ON/OFF switch (S4)], a ring-signal generator (12) and an off-hook detector (13). Also, there is a DC power source which is generally required by the interfaces of a computer. Practically, three relays of type GI LM44B00 are used as selector switches (S1), (S2) and (S3). The two terminals P4, P13 (4th and 13th pins) can be selectively connected to the terminals P6, P11 (6th and 11th pins) or terminals P8, P9 (8th and 9th pins) (See FIG. 3). For convenient sake, we call the selector switches (S1), (S2) and (S3) in "normal" state when their P4 and P13 are respectively connected to P6 and P11, and call them in "local" state when P4 and P13 are connected to P8 and P9. Selector switches (S2) and (S3) are automatically switched under the control of the controller (4), while selector switch (S1) must be operated manually via toggle switch (S1') (See FIG. 7) by the user. But in some special cases, the conducting state of selector switch (S1) can be temporarily forcedly changed to "local" state even though its toggle switch (S1') is still kept in the normal position. The reason will be explained later.

Normally the first selector switch (S1) is kept in its "local" position, while the second and third selector switches (S2) and (S3) are kept in their "normal" position. The normally-open switch (S4) is also a GI LM44B00 type relay, of which the terminals P4 and P8 (4th and 8th pins) serve as the two contacts. Its on/off state is also controlled by the controller (4).

As stated before, there are six possible conditions (A) to (F) in use. Since conditions (C) (D) (E) (F) are similar to the conventional use of computers and fax machines, and not specific to the present invention, their description is reduced to a minimum. Only conditions (A) and (B), which are specific to this invention, are specially designed in detail.

When an information is sent out from the computer (3), the controller (4) can judge from the command ("print" or "send") to know whether the information is to be sent to the local fax machine (2) or to the central office. But when an information comes from the central office, the controller (4) cannot guess the user's will to have it stored in the computer (condition D) or printed out by the local fax machine (condition F). Likewise, when the user takes off the hook of the telephone of the local fax machine (2), it is also impossible for the controller to guess the user's intension whether to send the information to the computer (3) (condition B) or to the central office (condition E). Thus in conditions D, F, B and E, the destination of the transmission must depend on the manually operated selector switch (S1). The controller (4) can detect the state of the selector switch (S1) and make proper response in each condition.

In order to make clear the states of the switches (S1) to (S4) in various conditions, we list them in Table I.

TABLE I

| Case | Switch | | | |
|---|---|---|---|---|
| | (S1) | (S2) RELAY | (S3) | (S4) |
| | 1 | 2 | 3 | 4 |
| (A) Computer to fax machine | L | L (busy) N (available) | L | OFF |
| (B) fax machine to computer | L | N | L | OFF |
| (C) Computer to central office | L or L* | N | N | ON |
| (D) Central Office to computer | L | N | N | ON |
| (E) Fax machine to central office | N | N | N | OFF |
| (F) Central Office to fax machine | N | N | N | OFF |

(L = Local, N = Normal. L* = Forced local)

The various conditions in practical use are stated in the following:

(A) THE FAX MACHINE IS USED AS A PRINTER TO PRINT OUT INFORMATION IN THE COMPUTER:

In this case, the selector switch (S1) must be kept in its "local" position. If it is in its "normal" position, the information in the computer cannot be printed out.

Figure 4:
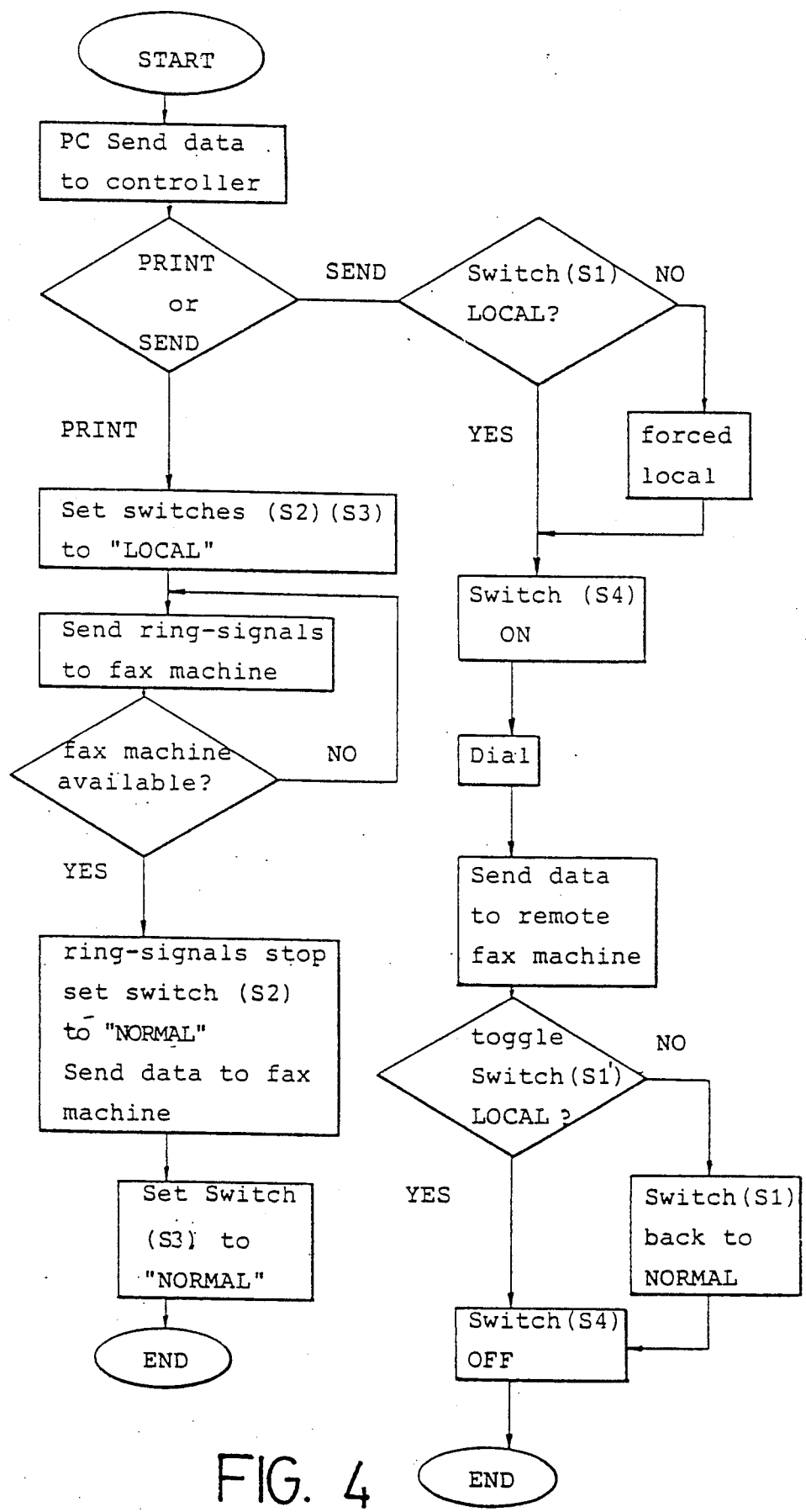
FIG. 4 is a flowchart showing the procedure when the fax machine is used as a printer, or when the information is directly transmitted from the computer to the central office.

Referring to FIG. 4, when information is outputted from the computer, it is first sent to the controller (4). The controller must judge whether the output of the computer is to be printed out by the fax machine or to be sent to the central office. From the "print" command given by the user, the controller understands that the information is desired to be printed out. Thus the controller (4) sets the selector switch (S3) to "local" state. Meanwhile, selector switch (S2) is also switched to its "local" position, and the ring-signal generator (12) is actuated to send ring-signals (which are intermittent pulses) via selector switches (S2) and (S1) to the fax machine (2) by the controller (4). If the fax machine is detected by the off-detector (13) as "busy" at this moment, it is not available, and the computer (3) has to wait until the fax machine (2) becomes free for use. During the waiting period, the ring-signal generator keeps on sending out ring-signals to the fax machine. [Note: as stated before, the waiting of the computer is not unlimited. Generally, the computer only waits for a predetermined period. In the case of the central office, the predetermined waiting time is 30 seconds. In the case of this interface device, the predetermined value may range from 30 seconds to 30 minutes, and can be set by the user by means of the computer. If the predetermined period is over, and the fax machine is still "busy", the computer will not wait any longer, so the "print" command will be aborted and the ring-signals will be stopped. This can prevent the machine from running endlessly in the loop of the program when the fax machine is not detected as available for a long time. For example, without the automatic aborting function, if the fax machine has trouble, or the line of the telephone attached to the fax machine is disconnected, or the hook is not hung on the holder during the arrival of the ring signals, then the "off-hook" state of the fax machine cannot be detected, and the ring-signal generator will ceaselessly send out ring-signals. Such condition must be avoided, and if occurs, must be automatically aborted. This "automatic abortion" is done by the software of the controller, and is not shown in the flowchart in FIG. 4. The "automatic abortion" can also be said to be a simulation of the central office.] If the fax machine is no longer occupied and becomes available for use, the off-hook detector will perceive its available state. Then the controller (4) will switch the selector switch (S2) to "normal" state and the ring-signal generator (12) stops sending out ring signals. Now, the information is transmitted from the computer (3) through selector switches (S3), (S2) and (S1) to the fax machine (2) and printed out. After the information has been printed out, the controller (4) switches the selector switch (S3) back to its "normal" position.

(B) THE FAX MACHINE IS USED AS SCANNER FOR THE COMPUTER:

As in (A), the selector switch (S1) must be kept in its local position. If the selector switch (S1) is in its normal position, the information scanned by the fax machine cannot be transmitted to the computer, but to the central office.

Figure 5:
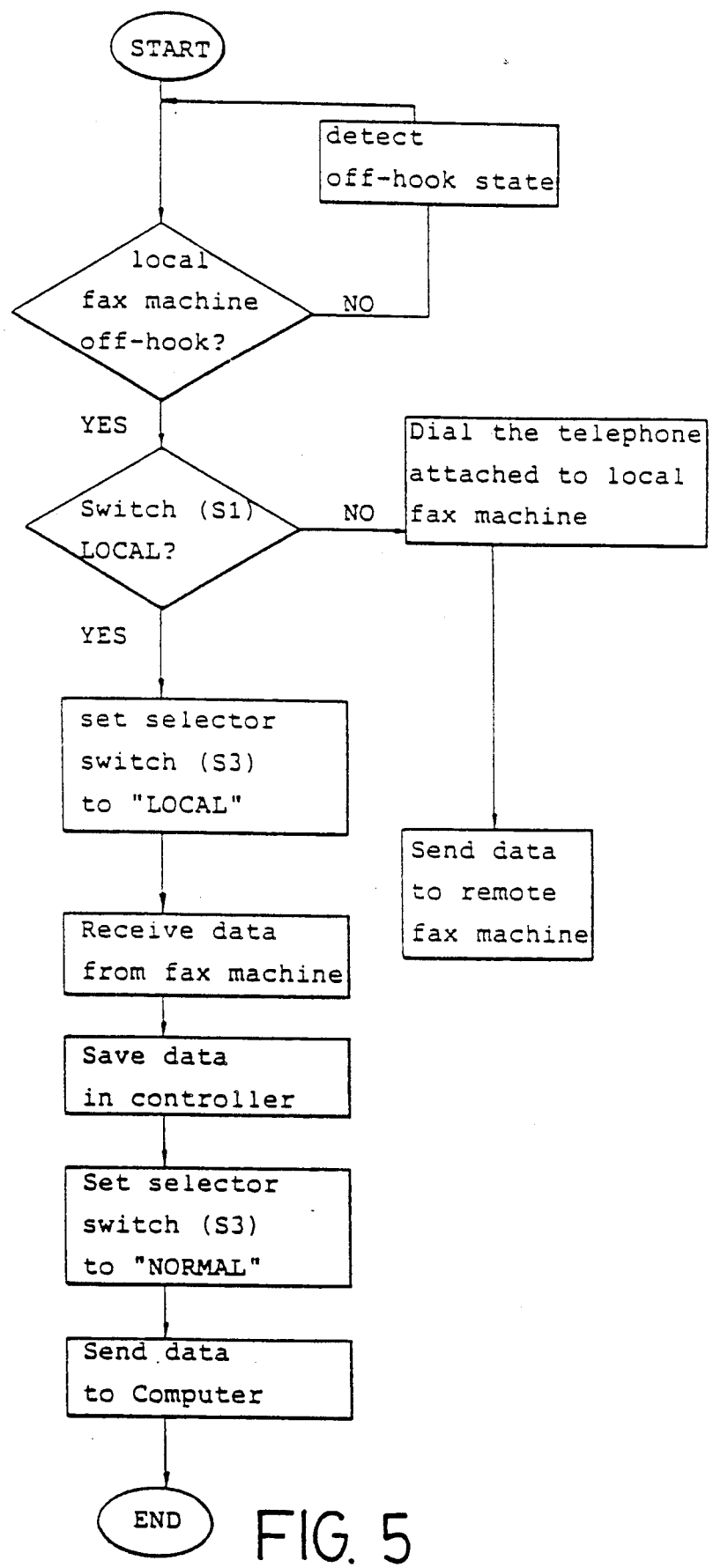
FIG. 5 is a flowchart showing the procedure when the fax machine is used as a scanner for the computer or sending out information to a remote fax machine.

It is noteworthy that the fax machine is unlike an ordinary scanner which can scan information on a sheet of paper directly. The scanning function of the fax machine can only be started when it is not busy and the handpiece of its attached telephone is taken off (off-hook state). Referring to the flowchart of FIG. 5. If the fax machine is not printing anything, when the handpiece is taken off, the off-hook detector (13) will perceive its off-hook state, and the detected result will be sent to the controller (4). When the handpiece of fax machine (2) is taken off, the fax machine can either send the scanned information to the central office or to the computer (3), depending on the normal or local state of selector switch (S1). If selector switch (S1) is in the "local" state, the controller (4) will set selector switch (S3) to its "local" state, and tell the computer to prepare to receive the information scanned by the fax machine. The scanned information passes selector switches (S1) (S2) and (S3) to controller (4) and is temporarily saved in the memory of the controller (4). Then the switch (S3) is switched by the controller (4) back to its normal state. Finally the data in the memory of the controller (4) is sent to the memory of the computer (3). As stated before, the off-hook detection is indispensible for condition (B), since only when the off-hook state is detected will the controller (4) (and also the computer) be informed of the arrival of information from the local fax machine (2), and the path between computer (3) and fax machine (2) can become passible.

(C) COMPUTER TO CENTRAL OFFICE

When information is desired to transmit from the computer (3) to the central office or to a remote fax machine, selector switch (S1) must be set to "local" state. Please refer to the flowchart in FIG. 4, when information is sent out by the computer (3), the controller (4) will receive a "send" command, from which the controller (4) understands that it is to sent out to the central office. Thus selector switch (S3) is kept in its "normal" state. Meanwhile, the normally-open switch (S4) is switched on. Now the information can be transmitted from the computer (3) to the central office via switches (S3) and (S4). The user can use the accessory telephone (17) to dial the fax number of the remote fax machine (the so-called "manual dial") or merely input the fax number from the keyboard and let the controller automatically communicate with the remote fax machine. (the so-called "auto dial"). When the transmission is over, switch (S4) will be switched off.

As stated before, the manually-operated selector switch (S1) can be forcedly changed to "local state" even though on the surface its toggle switch (S1') (see FIG. 7) still remains in "normal state". The reason is explained in the following:

In condition (C), if selector switch (S1) is not switched to its "local state", then both the computer (3) and the fax machine (2) are connected with the central office. Thus a noticeable portion of the signal from the computer (3) can be tapped through selector switch (S1) to the fax machine (2). Moreover, when the computer (3), the fax machine (2) and the central office all become communicable with one another, the signals from the computer, the central office and the fax machine can cross or collide together and causes considerable interference to the normal transmission. Such condition is undesired. Therefore, when the computer is sending information to the central office, if selector switch (S1) is unduly in "normal" position, the controller (4) will force its terminals (P4) and (P13) to switch to terminals (P8) and (P9) ("local" position), though on the surface the toggle switch (S1') still remains in its "normal" position. This state is referred to as "forced local". It prevents the undesired "tapping" and interferences of the transmitted information. In such "forced local" state, when the transmission of the information is over, the terminals (P4) and (P13) will be switched back to terminals (P6) and (P11) by the controller (4). For this purpose, the controller can detect the state of the toggle switch as well as the electrical (internal) state of selector switch (S1), and if the toggle switch (S1') is in the normal position, the selector switch (S1) will be switched back to its normal state after the transmission ends. (i.e. the "forced local" state is released.)

(D) CENTRAL OFFICE TO COMPUTER

Figure 6:
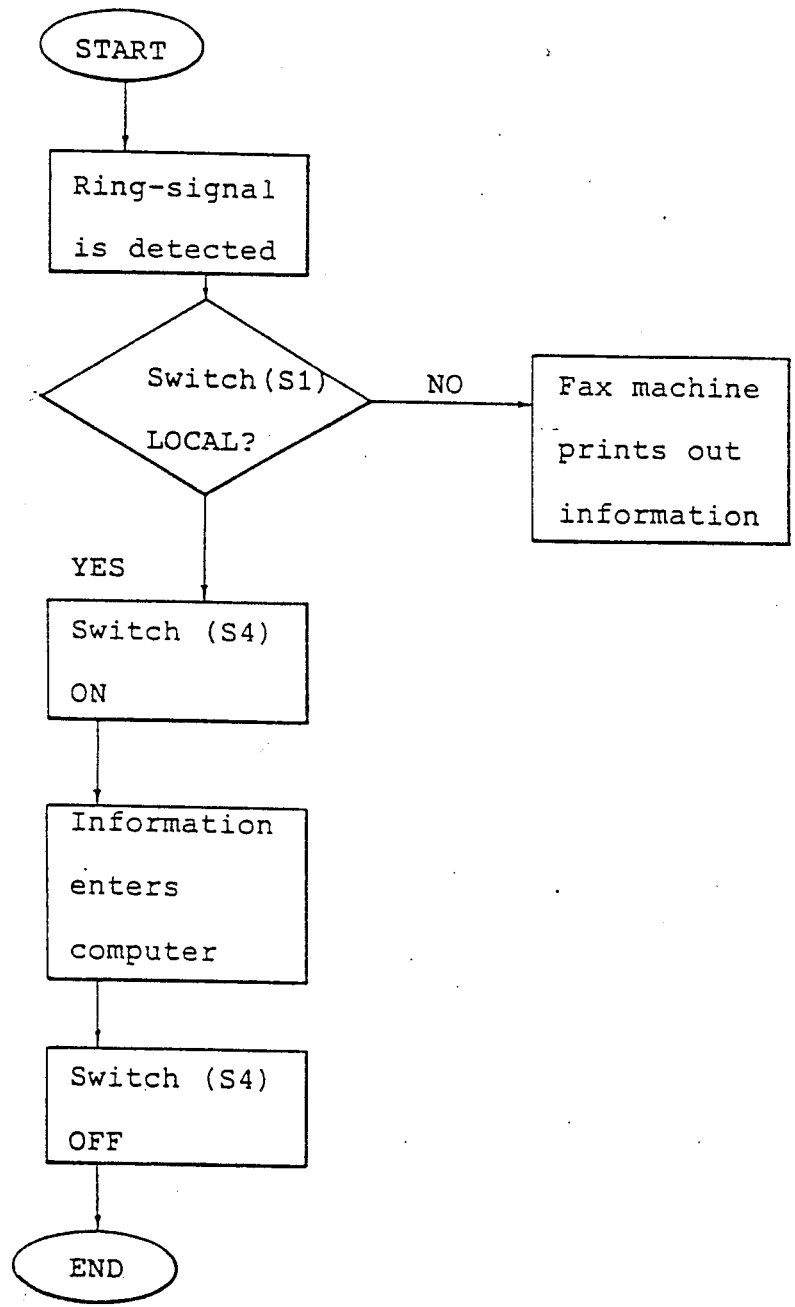
FIG. 6 is a flowchart showing the state when information is transmitted from the central office.

When information is transmitted from a remote fax machine, it can be either sent to the computer (3) and stored in its memory or displayed on its monitor, or alternatively be sent to the fax machine (2) and printed out, depending on the local or normal state of the selector switch (S1). Since it is impossible for the controller (4) to guess the user's intention whether to have this information stored in the computer [condition (D)] or printed out by the fax machine [condition (F)], the selector switch (S1) must be manually operated by the user. [And so is the case in conditions (B), and (E). When the hook of the fax machine (2) is taken off, the controller cannot judge the user's intention either, so the selection of (B) or (E) also depends on the position of manually operated selector switch (S1).] Please refer to the flowchart in FIG. 6. If information is transmitted from the central office, the ring-signal detector (15) will perceive the ring-signal in the information and will inform the controller (4) of the arrival of information from the central office. If the selector switch (S1) is in its "local state", the controller (4) will switch on switch (S4), and the informaiton can be transmitted through switches (S4) and (S3) to the computer (3). After the transmission is over, the controller (4) will switch off switch (S4). Alternatively, if selector switch (S1) is in "normal" position, the switch (S4) will remain in "OFF" state, and the information is transmitted to the fax machine (2) and printed out thereby.

(E) FAX MACHINE TO CENTRAL OFFICE
(F) CENTRAL OFFICE TO FAX MACHINE

The two conditions of (E) and (F) are relatively rare in practical use, since once the computer becomes directly communicable with the remote fax machines, the local fax machine will be reduced to but a subordinate printer and scanner for the computer, and is relatively seldom used to directly receive information from or to transmit information to the central office. However, with the two functions of (E), (F), if the computer has trouble, the fax machine can still work independently to communicate with the remote facsimile stations. It is only to be noted that in the conditions (E) and (F), selector switch (S1) is switched to its normal position.

As stated before, a telephone detector (16) is provided for an accessory telephone set (17). With the telephone set, the user can dial the number of a remote fax machine and then transmit the information in this computer to there. Also, the accessory telephone (17) can ring when information comes from the central office.

It is noteworthy that ordinary fax machines are also provided with their own built-in ring-signal detector and telephone detector. However, the ring-signal detector (15) and telephone detector (16) are not the ring detector and the telephone detector incorporated in the fax machine (2), and should not be confused with each other. To communicate with the central office, a fax machine is provided with its own telephone set, telephone detector and ring-signal detector. Likewise, the telephone set (17), telephone detector (16) and the ring-signal detector (15) are provided for the communication of the computer with the central office.

Figure 3:
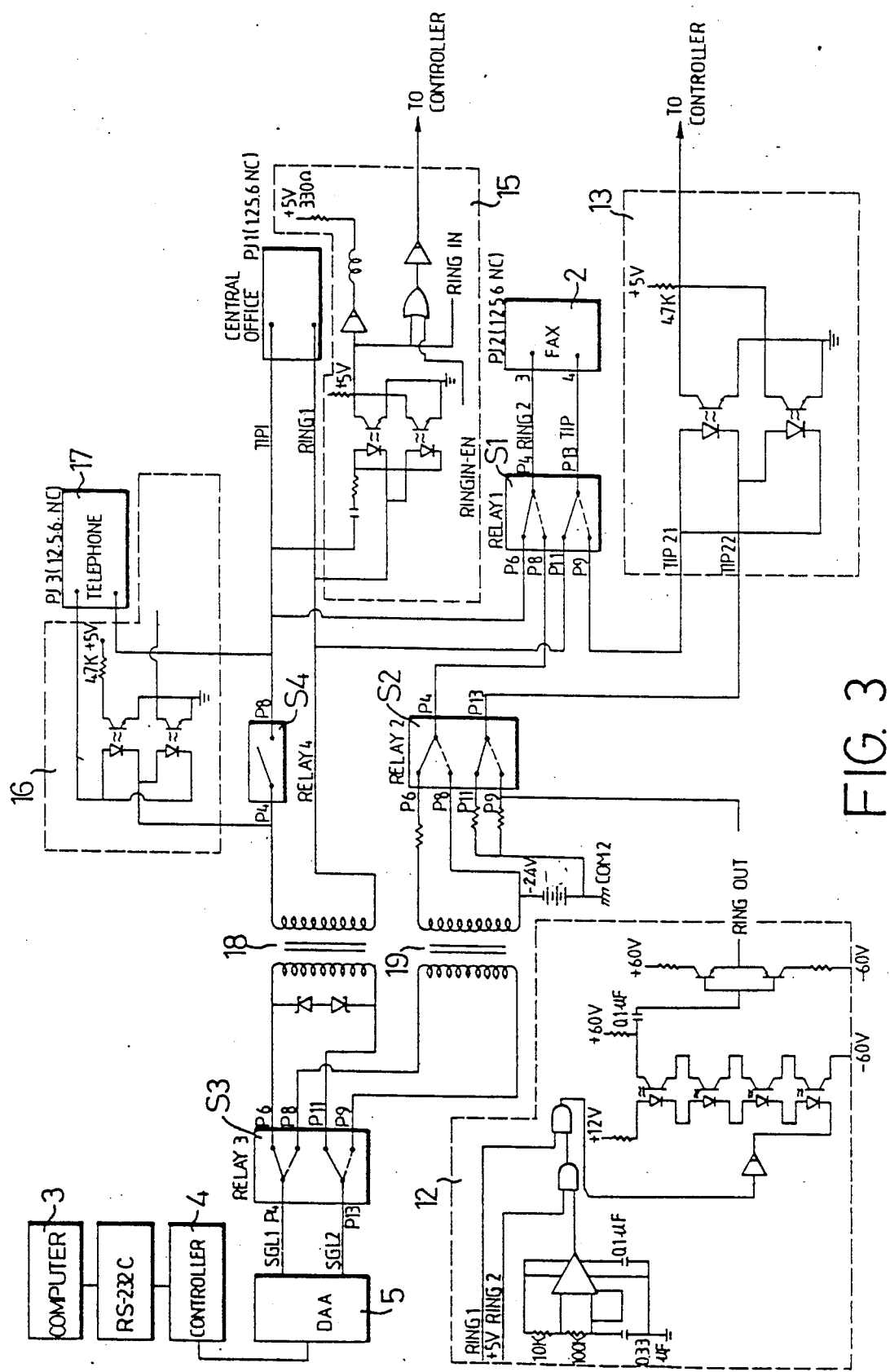
FIG. 3 is a circuit diagram corresponding to the block diagram in FIG. 2.

The circuit in FIG. 3 can be simplified by installing a single transformer between the DAA and the selector switch (S3), and omitting the two transformers (18) and (19). (The two lines of the primary side and the secondary side are then respectively connected with each other.) In doing so, we only need a single transformer.

Before information in the computer (3) is transmitted out (either to the fax machine or to the central office), it is preferably stored in the controller (4) first. [The controller (4) has a battery-supported memory for this purpose.] The controller (4) will check the bytes of the information to see if there is any error in the transmitted information. If there is any error, the controller (4) will tell the computer (3) to send out the information once more. This procedure is necessary since the transmission from a computer often has more or less errors. Likewise, the information transmitted from the central office is also stored in the controller and checked if there is any error before it is input into the computer. If so, the transmitting side will be informed to transmit the same information once more. This is a well known art (according to CCITT T.30), thus its detailed description is not necessary.

Figure 7:
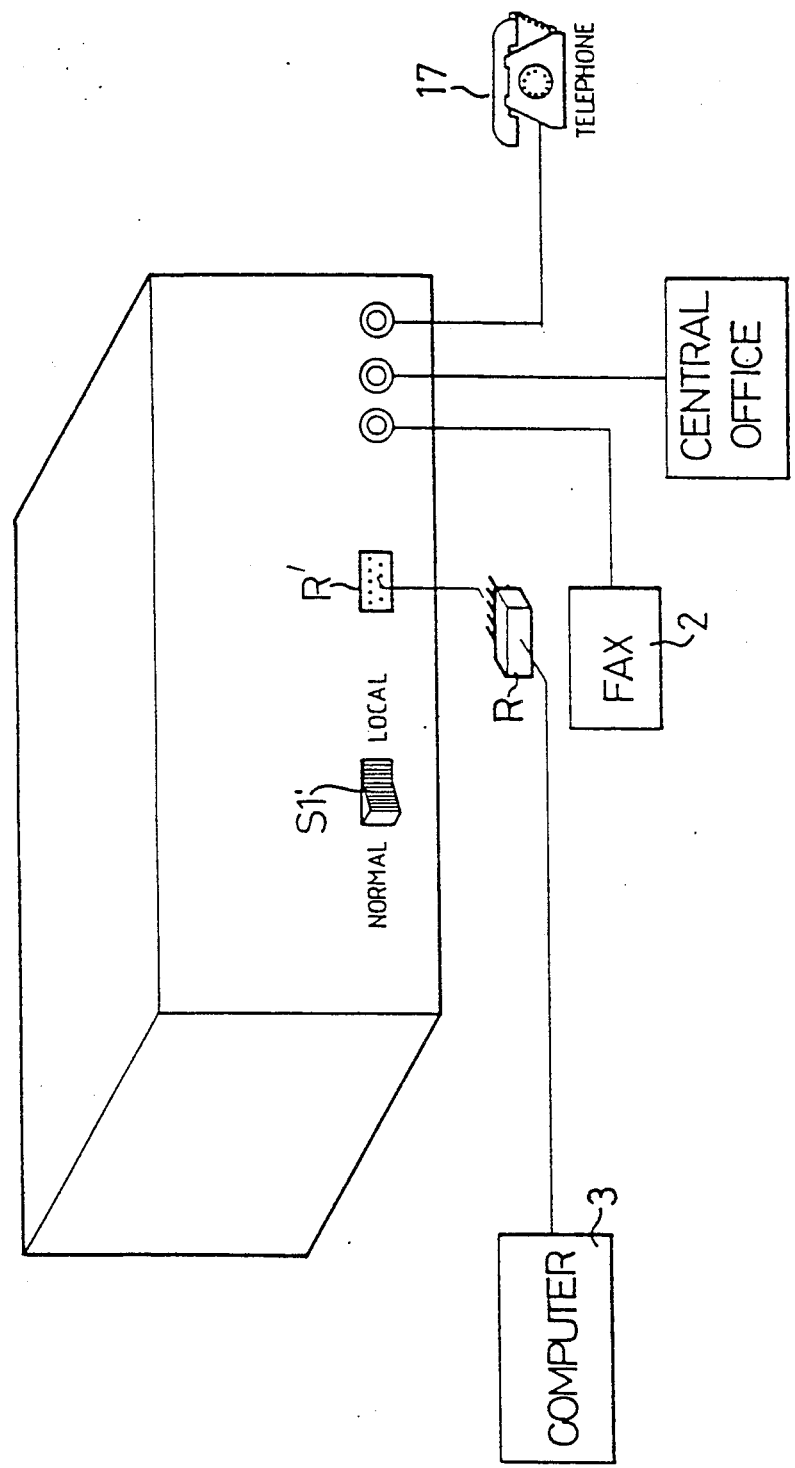
FIG. 7 is a perspective view of the interface device according to this invention.
Figure 8:
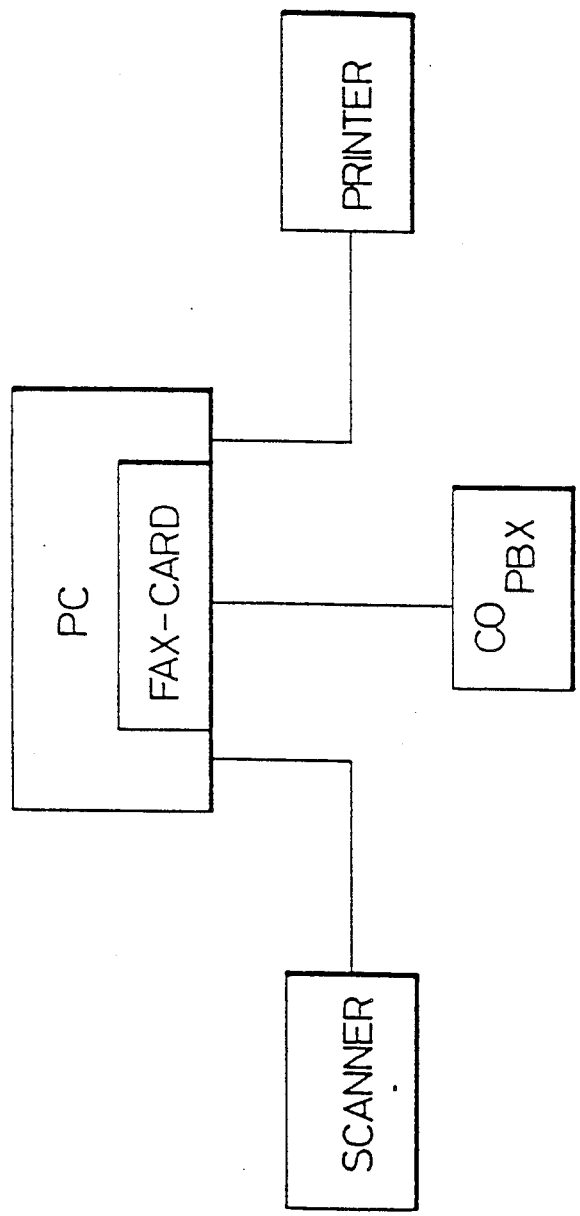
FIG. 8 is a conventional communication system of a computer using a scanner and a printer to function as a fax machine.

FIG. 7 shows an interface device according this invention. It has three phone jacks to connect with a fax machine (2), a cable to the central office, and an accessory telephone set (17). It also has a manually operated toggle switch (S1') to change the state of selector switch (S1). The RS-232C is divided into two engageable parts, namely a male RS-232C (R) and female (RS-232C (R'). The male RS-232C (R) is connected to the I/O of the computer (3), whereas the female RS-232C (R') is fixed on the interface device.

Last, but not least, it must be emphasized that the computer equipped with the interface device according to this invention still maintains all its versatility as a computer. Unlike the conventional fax-card, which, unless removed from a computer, makes the latter nothing but a fax machine, (in other words, almost all the functions of the computer are disabled), with the present invention, such problem does not exist.

The interface according the present invention is adapted to be used for all the existing types of fax machines and computers. Though the telephone system varies from country to country, this interface can be adapted to various telephone systems by selecting suitable DAA (5), which is made as a replaceable part of the interface device. The interface device makes it possible to utilize the available fax machine as the printer and scanner of the computer without any change to the original structure of the fax machine or the computer, thus considerably reducing the cost to computerize a fax machine. It is by far the most satisfactory device for the computerization of facsimile transmission.

I claim:

1. An interface device for the intercommunications any two of a computer, a fax machine, and a cable leading to one of a central office and a private branch exchange, said interface device being connected respectively to said computer, said fax machine and said cable, and comprising a simulating unit comprising a ring-signal generator for producing intermittent ring-signals to which said fax machine can be responsive when not busy, and an off-hook detector which detects the state of said fax machine, said device comprising a switching system to selectively interconnect any two of said computer, said fax machine and said cable, said switching system including a first selector switch which selectively connects said fax machine to any one of said cable and said computer;

said controller being disposed between said computer and said switching system, and having software for controlling said switching system and said ring-signal generator, which is so programmed that:

(a) when said controller receives information with a "print" command from said computer, said ring-signal generator will start to send ring-signals to said fax machine, and if said fax machine is detected by said off-hook detector to be in non-busy state, said ring-signal generator will stop sending ring-signals to said fax machine, while said computer and said fax machine will be connected and the information from said computer is printed out by said fax machine;

(b) when said fax machine is used to scan information and if the first selector switch connects said fax machine to said computer, the scanned information is transmitted to said computer if said fax machine is detected to be in the off-hook state;

(c) when said controller receives an information with a "send" command from said computer, the information from said computer will be sent to said cable;

(d) when information is transmitted from said central office, said information will be transmitted to one of said computer and said fax machine depending on the state of said first selector switch, said device being characterized by that said switch system comprises, apart from said first selector switch, a second selector switch and a third selector switch and a normally-open switch, each of said first, second, and third selector switches having a first, second, third, fourth, fifth and sixth terminal, and each of the said selector switches having a first switching state in which said first terminal is connected to said third terminal and said second terminal is connected to said fifth terminal, and a second switching state in which said first terminal is connected to said fourth terminal and said second terminal is connected to said sixth terminal, said first and second terminal of said first selector switch being connected to said fax machine, said third terminal and fifth terminal of said first selector switch being connected to said cable, said fourth terminal of said first selector switch being connected to said first terminal of said second selector switch, said sixth terminal of said first selector switch being connected to said off-hook detector, said second terminal of said second selector switch being connected to said off-hook detector, said third and fourth terminals of said second selector switch being connected to said fourth and sixth terminals of said third selector switch, said sixth terminal of said second selector switch being connected to said ring generator, said third and fifth terminals of said third selector switch being connected to said normally-open switch and said cable, said first and second terminals of said third selector switch being connected to said controller.

2. The interface device according to claim 1, wherein said first selector switch is forcedly switches to its electrically second state when said computer is transmitting information to said cable if said first selector switch is in its first state, and switches back to its first state when the transmission of said information is over.

3. The interface device according to claim 1, wherein a ring-signal detector is disposed between said computer and said cable to detect the ring-signal in the information transmitted from said cable, and when a ring-signal is detected by said ring-signal detector and if said first selector switch is in its second state, said controller will switch on said normally-open switch.

* * * * *